United States Patent [19]

Boundy

[11] Patent Number: 5,131,620

[45] Date of Patent: Jul. 21, 1992

[54] RACK FOR SUSPENDING A COMPONENT BELOW A SUPPORT SURFACE

[75] Inventor: Bruce K. Boundy, Caledonia Twp., Kent County, Mich.

[73] Assignee: Westinghouse Electric Corp., Pittsburgh, Pa.

[21] Appl. No.: 670,634

[22] Filed: Mar. 18, 1991

[51] Int. Cl.$^5$ .............................................. F16M 13/00
[52] U.S. Cl. ............................... 248/674; 248/225.1; 248/317; 248/499; 248/505
[58] Field of Search .................... 248/225.1, 637, 674, 248/675, 223.4, 309.1, 317, 320, 323, 327, 328, 499, 680, 201, 500, 505

[56] References Cited

U.S. PATENT DOCUMENTS

| | | | |
|---|---|---|---|
| 3,822,049 | 7/1974 | Saunders | 248/674 |
| 3,937,437 | 2/1976 | Stewart | 248/499 |
| 4,540,146 | 9/1985 | Basile | 248/201 |
| 4,580,754 | 4/1986 | Hughes | 248/201 |
| 4,858,878 | 8/1989 | Gassaway | 248/680 |
| 4,982,927 | 1/1991 | Zajeski | 240/674 |

Primary Examiner—David L. Talbott
Attorney, Agent, or Firm—D. R. Lackey

[57] ABSTRACT

A rack for suspending an electrical or mechanical component below a support surface. The rack is quickly assembled with relatively few parts, but it is easily adjustable to a accommodate a large variety of component shapes and dimensions. The rack includes two loops each having a right angle member, a strap or belt, and a buckle. The two loops are associated with a plate member which supports and separates the loops. The plate member is placed on the upper surface of the electrical component to be suspended and the two loops are then tightly secured about the component. The resulting assembly is then attached to the support surface. In a preferred embodiment, a bracket is secured to the support surface and the plate member of the assembly is telescopically engaged with the bracket, horizontally sliding the assembly into position below the support surface.

7 Claims, 2 Drawing Sheets

RACK FOR SUSPENDING A COMPONENT BELOW A SUPPORT SURFACE

TECHNICAL FIELD

The invention relates in general to support racks, and more specifically to support racks for supporting an electrical or mechanical component below a support surface.

BACKGROUND ART

When work surface space is at a premium, it is common to suspend an electrical or mechanical component, such as a central processing unit (CPU) of a computer, below the work surface in a support rack. In order to provide adjustment for different sized components, the racks of which I am aware have a plurality of telescoping metallic parts. For example, a typical rack consists of two loops which the user slings about the component to be suspended. Each loop has eight metallic pieces having telescoping details to adjust the loop size to the size of the component. Two runners, each having three metallic pieces, connect the bottoms of the two loops. This entire assembly, which includes the twenty two piece rack, is then secured to the bottom of a support surface, using a plurality of screws. It takes a trained installer about forty minutes to assemble this rack with a component and fix the assembly to a support surface.

SUMMARY OF THE INVENTION

The present invention is a new rack for suspending an electrical component below a support surface. The rack has very few parts, it is easy to assemble about a wide variety of component configurations and dimensions, and the resulting assembly is easy to fix to a support surface, resulting in a lower manufacturing cost for the rack, and substantially less assembly and installation time. The rack includes two identical loops. Each loop includes a right angle or L-shaped member having first and second leg portions, a strap or belt having first and second ends, and a buckle for coupling the belt ends in a loop while permitting adjustment of loop size. A support plate links the two loops, with predetermined leg portions of the right angle members being associated with the support plate such that the remaining leg portions depend vertically from the support plate in spaced parallel relation.

The electrical component is placed on the floor in the orientation it is to have when suspended, and the support plate is placed on the upper facing surface of the electrical component. The depending leg portions extend down one vertically oriented side of the component, and the belts, which extend about the leg portions of the associated right angle member, are looped about the component. The two loops are then tightly secured or clinched about the electrical component and the resulting assembly is fixed to the support surface.

In a preferred embodiment, the means for fixing the assembly to the support surface includes a bracket which is independently fixed to the support surface, with the bracket and support plate of the assembly being cooperatively configured to enable the bracket and support plate to telescope together. The assembly is placed adjacent to the support surface and any electrical cords and plugs which are part of the electrical component may be engaged with their associated sockets. The assembly is then lifted to the height of the bracket, the support plate and bracket are aligned, and the assembly is horizontally advanced into position below the support surface as the support plate and bracket are coupled.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
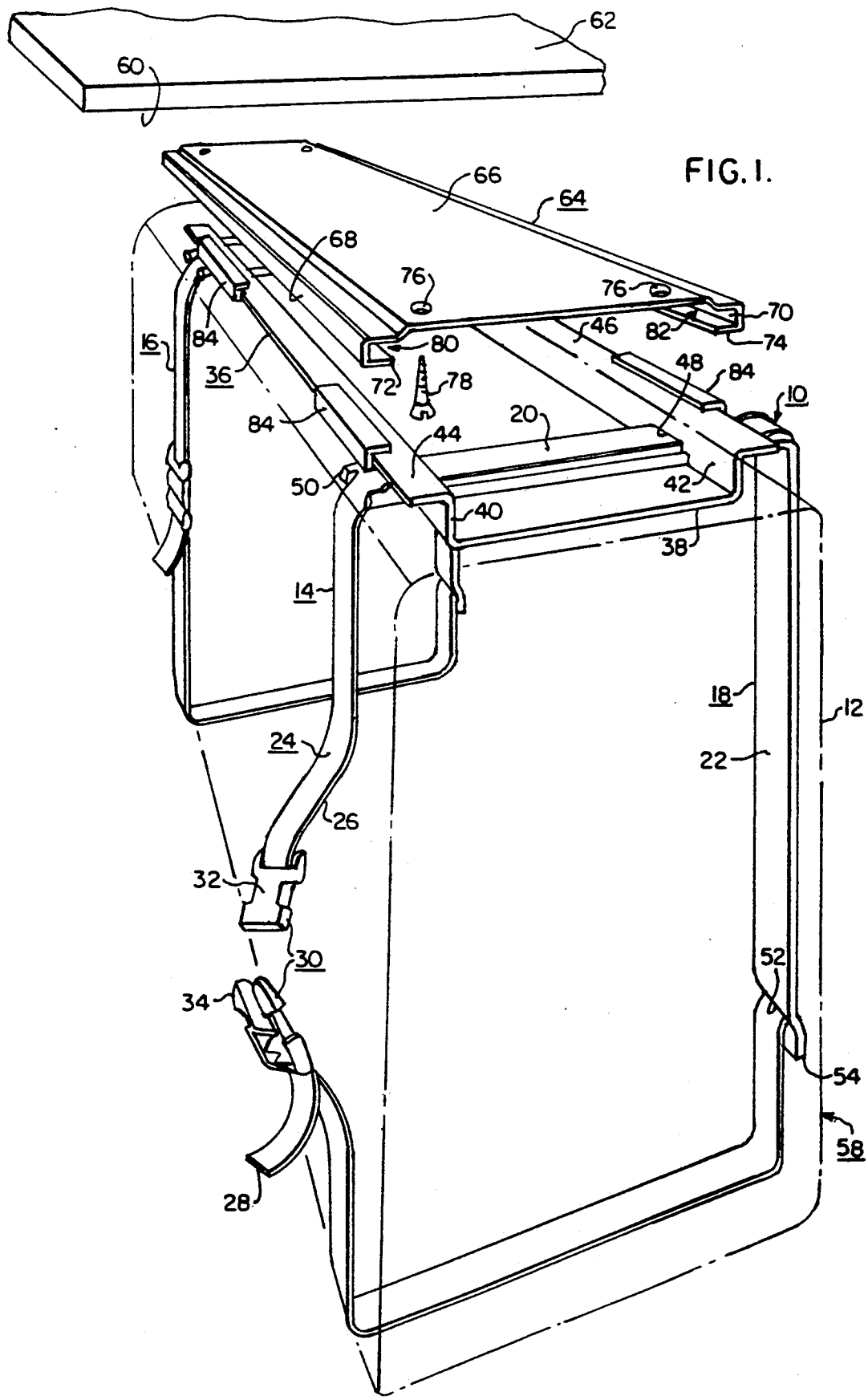
FIG. 1 is a partially exploded perspective view of a rack constructed according to a first embodiment of the invention.

Referring now to the drawings, and to FIG. 1 in particular, there is shown a partially exploded perspective view of a rack 10 constructed according to a first embodiment of the invention. Rack 10 is shown assembled with an electrical component 12. Electrical component 12 is shown in phantom since electrical or electronic components having a wide variety of configurations and dimensions may be supported by rack 10.

Rack 10 includes first and second loops 14 and 16, respectively, which may be identical, and thus only the first loop 14 will be described in detail. Loop 14 includes a right angle member 18 which is formed of metal or a high strength plastic. Right angle member 18 has first and second leg portions 20 and 22, and it is oriented in an inverted L-shaped position with leg portion 20 being horizontal and leg portion 22 depending therefrom in a vertical orientation. Loop 14 further includes a relatively narrow fabric web in the form of strap or belt 24 having first and second ends 26 and 28. A separable coupling device, such as a buckle 30, completes loop 14. Buckle 30 has cooperative receptacle and clasp members 32 and 34, respectively, with the receptacle and clasp members 32 and 34 being secured adjacent to ends 26 and 28, respectively, of belt 24. U.S. Pat. No. 4,150,464 discloses a suitable buckle, but other separable coupling arrangements may be used.

A support plate 36 is associated with the first and second loops 14 and 16, linking both loops 14 and 16 to provide support therefor while establishing the desired spacing between the loops as well as orienting the right angle members 18 into the required inverted L-shaped positions. Support plate 36, which is preferably formed of metal or a high strength plastic, is an elongated member having a channel or U-shaped cross-sectional configuration. Support plate 36 includes a bight 38 and first and second upstanding leg portions 40 and 42, with the ends of the leg portions 40 and 42 being bent orthogonally outward to form flanges 44 and 46, respectively. Each leg portion 40 and 42 is provided with a pair of openings, such as opening 48 shown in leg portion 42, with the openings in one leg portion being aligned with the openings in the other leg portion. Leg portions 20 of the right angle members 18 are snugly but slidably disposed through the aligned openings.

The ends 50 of leg portions 20 extend outwardly past leg portion 40 of support plate 36, with the ends 50 being configured to hold and guide belt 24, eg., the ends may be formed with an appropriate U-shaped depression. The ends 54 of leg portions 22 of right angle members 18 may also be appropriately configured to retain and guide belts. For example, as illustrated, slots 52 may be formed near ends 54, with slots 52 retaining and guiding belts 24. In other embodiments, both ends 50 and 54 may be provided with like belt guiding configurations. For example, the leg portions 20 and 22 may have different length dimensions, as illustrated, with either the longer or shorter of the two legs being disposed through the aligned openings 48, depending upon the configuration, dimensions, and desired orientation of the component 12 to be suspended in rack 10.

In the assembly of rack 10 with component 12, the component 12 is simply placed on the floor or other suitable place, in the orientation that it is to assume in the suspended position. The support plate 36 is then placed on the upper facing surface of the component 12. The right angle members 18 and belts 24 may be assembled with the support plate 36 either before or after the support plate is positioned on component 12, as desired. The component 12 is then lifted slightly to enable belts 24 to be placed under it, the receptacle 32 and clasp 34 of buckle 30 are engaged, and the belt ends 28 pulled to securely fasten belts 24 about component 12.

Figure 2:
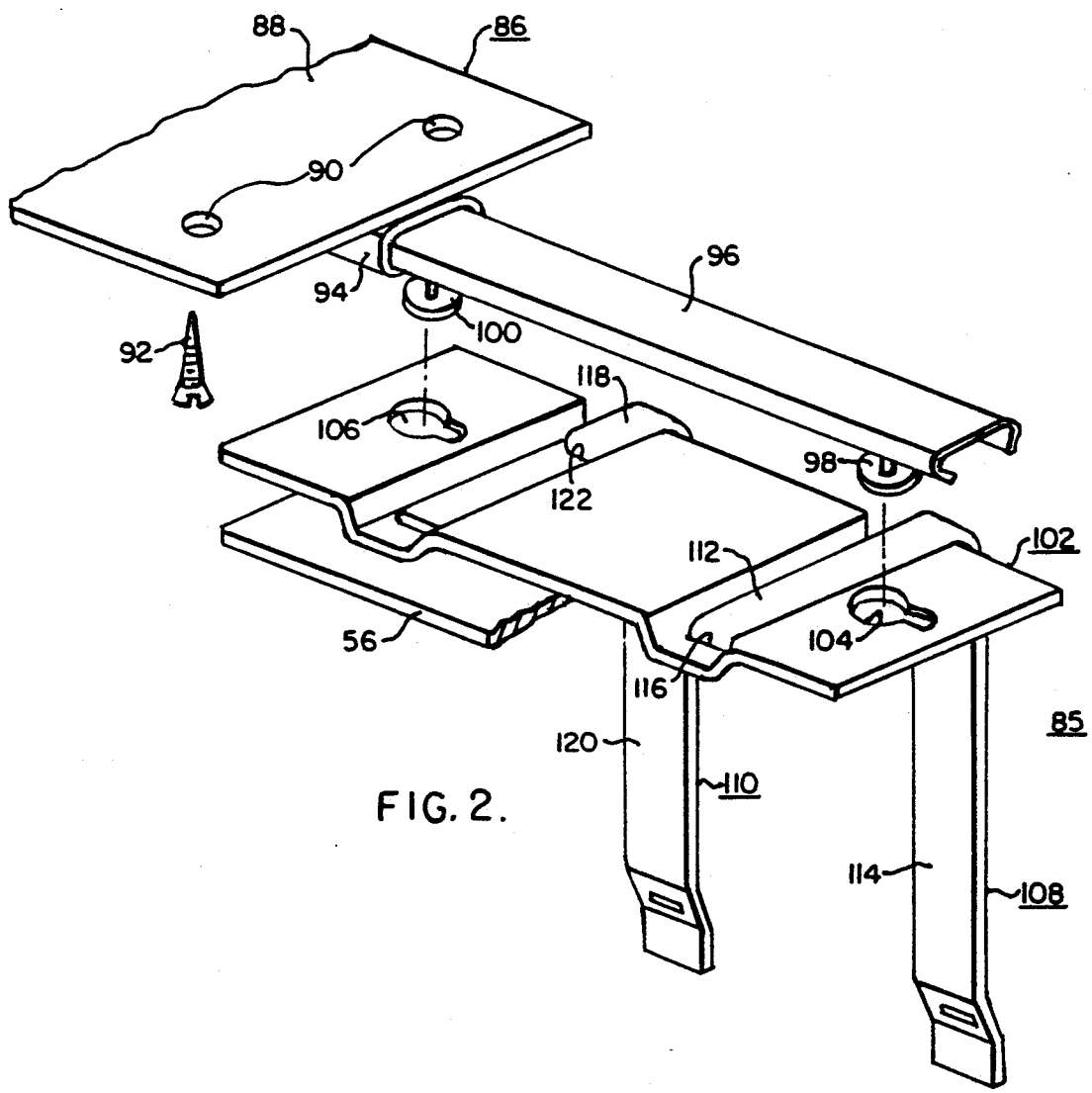
FIG. 2 is a partially exploded perspective view of a rack constructed according to another embodiment of the invention.

If desired, a sheet 56 of rubber, plastic or other suitable compressible resilient material, shown in FIG. 2, may be placed between component 12 and support plate 36 before support plate 36 is positioned on component 12. Sheet 56, in addition to protecting the surface of component, negates the effects that slight stretching of belts 24 may have over a period of time. The initial retightening of the belts 24 will compress sheet 56. Slight belt stretching thereafter will thus be compensated by decompression of sheet 56.

The attachment of rack 10 to component 12 provides an assembly 58, and assembly 58 is then attached to a support surface 60, which, for example, may the under side of a work surface 62. Flanges 44 and 46 may be made wide enough such that they may be directly attached to surface 60. For example, surface 60 may have screws secured thereto and one of the flanges 44 or 46 may have slots which engage the screws. The remaining flange may have openings for receiving additional screws which complete the attachment. This direct means for attaching assembly 58, however, requires the installer to work in an awkward position while fighting gravity, and is thus not the preferred attachment means. FIG. 1 illustrates a preferred attachment means, and FIG. 2 illustrates still other attachment hardware which may be used.

More specifically, FIG. 1 illustrates a bracket 64 which has a cross sectional configuration which is complementary to that of support plate 36, for a cooperative sliding or telescoping function. Bracket 64 has an inverted U-shaped cross sectional configuration which includes a bight 66 and first and second depending leg portions 68 and 70. The depending leg portions 68 and 70 are bent inwardly adjacent to their ends to form flanges 72 and 74. Bight 66 has a plurality of openings 76 for receiving screws 78, with screws 78 independently securing bracket 64 to support surface 60. The inwardly directed flanges 72 and 74 form support pockets 80 and 82 for the flanges 44 and 46, respectively, of support plate 36. The support pockets 80 and 82 may be dimensioned to snugly but slidably receive flanges 44 and 46; or, as illustrated in FIG. 1, flanges 44 and 46 may each be provided with a pair of spaced edge pieces 84, in which event pockets 80 and 82 would be dimensioned to slidably receive edge pieces 84.

Bracket 64 is fixed to support surface 60 with screws 78, and assembly 58 is then secured to support surface 60 by first lifting assembly 58 to align an end of support plate 36 with bracket 64, and then horizontally advancing assembly 58 into the desired position below surface 60 as the flanges 44 and 46 of support plate 36 telescope with pockets 80 and 82 of bracket 64.

FIG. 2 illustrates a rack 85 which sets forth another attachment embodiment of the invention. Instead of having a support plate constructed to telescope into a bracket attached to support surface, in the embodiment of FIG. 2 the bracket itself has both telescoping components. More specifically, rack 85 is attached to support surface 60 via a bracket 86. Bracket 86 includes an attachment plate 88 which is fixed to support surface 60 via openings 90 in plate 88 and screws 92. Bracket 86 further includes first and second inverted U-shaped members 94 and 96, with U-shaped member 96 being slidable within U-shaped member 94. U-shaped member 96 is longer than U-shaped member 94 to enable member 96 to be advanced outwardly from member 94 while maintaining a sufficient length of member 96 within member 94 for firm support. The first U-shaped member 94 is welded or otherwise suitably fixed to the underside of plate 88, and the second U-shaped member 96 has depending support members or knobs 98 and 100 fixed thereto.

Rack 85 includes a support plate 102 having key-shaped openings 104 and 106 formed therein which are dimensioned to receive support knobs 98 and 100, respectively. Thus, after support plate 102 is fixed to component 12 shown in FIG. 1 with the belts 24 shown in FIG. 1, the second U-shaped member 96 is partially advanced from U-shaped member 94. The assembly consisting of rack 85 and component 12 is lifted, the knobs 98 and 100 are aligned to enter the key-shaped openings 104 and 106 such that the knobs advance into the narrow portions of the openings, and the assembly along with now coupled second U-shaped member 96 are advanced into position below surface 60.

FIG. 2 also illustrates first and second right angle members 108 and 110 which differ from right angle members 18 shown in FIG. 1. Right angle members 108 and 110 are also illustrated as being different from one another in order to illustrate additional embodiments of right angle members which may be used. Both right angle members 108 and 110 may be used together, or the required two right angle members may both be constructed according to right angle member 108, or both may be constructed according to right angle member 110, as desired. Right angle member 108 includes first and second leg portions 112 and 114 having lengths similar to those of right angle members 18 shown in FIG. 1. The end of leg portion 112 may be bent to enter a slot 116 in support plate 102; or, other suitable means may be used to secure leg portion 112 to support plate 102. Right angle member 110 differs from right angle member 108 in that it uses the support plate 102 itself to help provide the function of one of the leg portions. Right angle member 110 includes first and second leg portions 118 and 120, with leg portion 118 being just long enough to hook into a slot 122 disposed near an edge of support plate 102. The embodiment of FIG. 2 may also use the hereinbefore mentioned resilient sheet or pad 56 between the support plate 102 and component 12.

In summary, there has been disclosed new and improved support racks for supporting an electrical component below a support surface. The new support racks have only a few low cost parts, enabling the racks to be manufactured for substantially less cost than the hereinbefore mentioned prior art racks of which I am aware. Also, the new racks are quickly assembled with an electrical component and easily stored below a work surface, requiring only about 8 to 10 minutes time, compared with about 40 minutes for prior art component racks.

What is claimed is:

1. A rack for suspending an electrical or mechanical component below a support surface, comprising:
   first and second loop means,
   each of said first and second loop means including right angle means defining first and second leg portions, a belt having first and second ends, and a buckle for coupling the belt ends in a loop which includes the right angle means while permitting adjustment of loop size,
   a support plate linking said first and second loop means, with predetermined leg portions of the right angle means being associated with the support plate such that the remaining leg portions depend vertically from the support plate in spaced parallel relation to engage a portion of a component supported thereby,
   said first and second loop means constructed and arranged to be tightly secured about said component to provide a first assembly,
   a support surface,
   and means attaching said first assembly to said support surface.

2. The rack of claim 1 wherein the means attaching the first assembly to the support surface includes a bracket which is fixed to the support surface, with said bracket and the support plate having complementary configurations wherein the support plate is telescopically engaged with said bracket.

3. The rack of claim 1 wherein the means attaching the first assembly to the support surface includes a bracket having a stationary portion fixed to the support surface, and a movable portion which is slidably engaged with the stationary portion, with the first assembly being removably attached to said movable portion.

4. The rack of claim 1 wherein the right angle means each include a discrete right angle member, the means attaching the first assembly to the support surface includes a bracket having an inverted U-shaped cross-sectional configuration, including a bight and first and second depending, inwardly flanged legs, and the support plate has a substantially U-shaped cross-sectional configuration, including a bight and first and second upstanding, outwardly flanged legs, with the upstanding legs having openings through which the belts and predetermined leg portions of the discrete right angle members are disposed.

5. The rack of claim 4 wherein the inwardly flanged legs of the bracket define support pockets within which portions of the outwardly flanged legs of the support plate slidably extend.

6. The rack of claim 1 wherein the first leg portions of the right angle means are integral portions of the support plate, and the second leg portions of the right angle means include discrete leg portions which depend from and are removably supported by the support plate.

7. The rack of claim 1 including resilient means disposed between the support plate and a component to be suspended.

* * * * *